Figure 1:
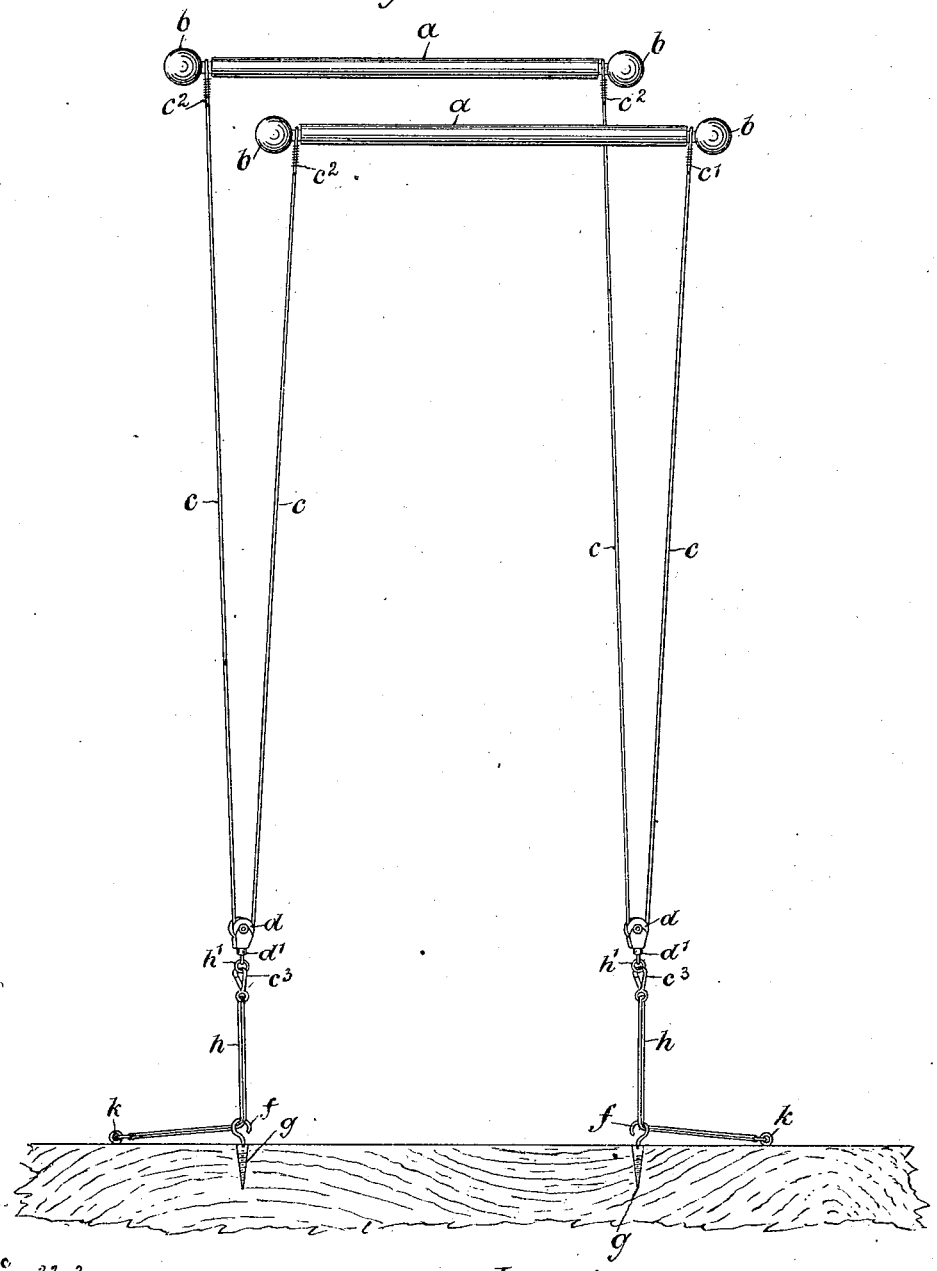

No. 725,876. PATENTED APR. 21, 1903.
C. H. ROCHE.
EXERCISING APPARATUS.
APPLICATION FILED OCT. 6, 1899.
NO MODEL. 2 SHEETS—SHEET 1.

Witnesses.
Robt A. Blake
R. A. Smith

Inventor.
Charles Henderson Roche,
by Henry H. Leigh
Attorney.

No. 725,876. PATENTED APR. 21, 1903.
C. H. ROCHE.
EXERCISING APPARATUS.
APPLICATION FILED OCT. 6, 1899.
NO MODEL. 2 SHEETS—SHEET 2.
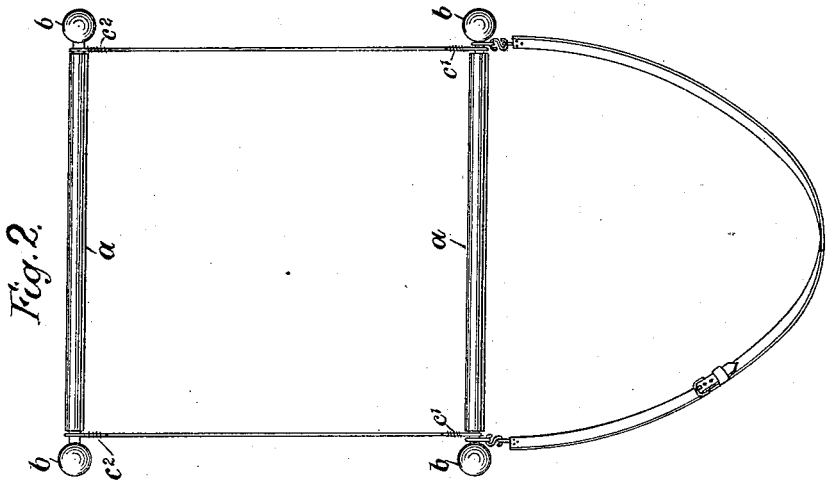
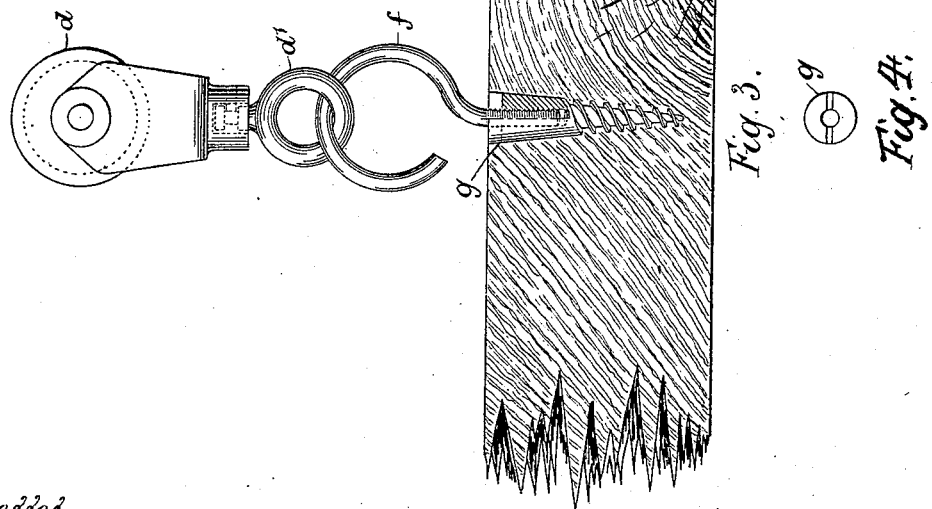
Witnesses.
Rob⁺ A. Blake
R. A. Smith.
Inventor.
Charles Henderson Roche,
by Henry H. Leitz
Attorney.

UNITED STATES PATENT OFFICE.

CHARLES H. ROCHE, OF TONBRIDGE, ENGLAND.

EXERCISING APPARATUS.

SPECIFICATION forming part of Letters Patent No. 725,876, dated April 21, 1903.

Application filed October 6, 1899. Serial No. 732,807. (No model.)

*To all whom it may concern:*

Be it known that I, CHARLES HENDERSON ROCHE, residing at Ashburnham road, Tonbridge, in the county of Kent, England, have invented certain new and useful Improvements in a Combined Exercising and Developing Apparatus; and I do hereby declare the following to be a full, clear, and exact description of the invention, such as will enable others skilled in the art to which it appertains to make and use the same.

This invention relates to improvements in combined exercising and developing apparatus.

The apparatus consists of a combination of handle-bars, elastic or india-rubber cord, pulleys, foot or other attachments, hooks and fittings.

I will now proceed to describe the invention and the method of using it, reference being had to the accompanying drawings, in which—

Figure 1 represents the apparatus fitted up in a manner such that it may be employed to exercise each of the two arms separately as well as the rest of the muscles of the body by applying pressure to force the handle-bars away from the ground on which the operator is standing. Fig. 2 shows the same apparatus fitted with shorter elastic cords and with a non-stretchable strap, but without the pulleys and floor-fittings. Figs. 3 and 4 show, on an enlarged scale, the floor-fittings and a swiveling pulley such as are shown on a smaller scale in Fig. 1, the non-elastic cord $h$ being removed.

In the drawings, $a\ a$ are handle-bars of a length greater than the breadth of the shoulders, the ends of which are connected together by two elastic cords $c\ c$, the connection with the ends of the handle-bars being made by means of loops $c'$, with or without rings, which are threaded over screwed spills, which project from the ends of the handle-bars, onto which may be screwed weights $b$. When used in the manner shown in Fig. 1, each of the elastic cords $c$ is passed around a pulley $d$, mounted in a block, which swivels about an eye $d'$. This is secured by a non-stretchable cord $h$ to a screw $k$ after passing through the eye of a hook $f$. To facilitate the secure attachment of the hook $k$ to the floor and its ready removal therefrom without injury, a screw $g$ is provided, which is furnished with a threaded hole adapted to receive the end of the hook $f$ by screwing, the screw $g$ having a slotway for a screw-driver, as shown in Fig. 4.

The height of the handle-bars can be made adjustable by altering the length of the non-elastic cord $h$ by doubling it or using it single or dispensing with it entirely, as shown in Fig. 3, disengaging swivels $c^3$ being provided to facilitate this alteration. Instead of using the two screws $k\ k$ the ends of the cords $h$ may be joined together.

Instead of grasping the bars each with one hand and exercising each independently both hands may grasp both bars, one or both pairs of weights being removed for the purpose, or only one bar may be grasped by both hands while the other is immovable on the ground by being trodden on. Alternatively, while one or both hands grasp one rod the other may be movably pressed on by one foot or if a seat is provided by both feet, and thus a variety of exercises may be performed with the apparatus.

When it is not convenient to use the floor-fittings, the apparatus may be adapted for use without, as shown in Fig. 2. For this purpose shorter elastic cords are used, these being readily changed by unscrewing the weights $b$. For the exercise of the foot a non-stretchable strap is added, connecting the two ends of one of the rods. Thus modified practically the same exercises may be performed as those described with reference to Fig. 1.

I claim—

1. An exercising and developing apparatus consisting of two rigid bars longer than the shoulders are broad connected one with the other by two elastic cords in such manner that the four members form a parallelogram, substantially as described and set forth.

2. The combination with an exercising and developing apparatus consisting of two rigid bars longer than the shoulders are broad connected one with the other by two elastic cords, of a weight secured removably on each end of each bar, substantially as described and set forth.

3. The combination of an exercising and developing apparatus consisting of two rigid bars longer than the shoulders are broad connected one with the other by two elastic cords, weights secured removably on each end of one of the bars, and a strap connected at each end to one of the bars, so as to hang in a curve below the bar, substantially as described.

4. An exercising and developing apparatus consisting of a combination of two rigid bars longer than the shoulders are broad, two elastic cords each uniting the two said rods at opposite ends thereof, weights removably secured to the ends of the rods and pulleys, attached to the floor, around which the elastic cords are led, substantially as described.

In testimony that I claim the foregoing as my invention I have signed my name in presence of two subscribing witnesses.

CHAS. H. ROCHE.

Witnesses:
W. H. WILLIAMS,
EDWARD ZUTTNER.